(12) United States Patent
Ben Aziza et al.

(10) Patent No.: US 11,358,407 B2
(45) Date of Patent: Jun. 14, 2022

(54) MULTILAYERED OPTICAL SECURITY DEVICE

(71) Applicant: Hong Kong Applied Science and Technology Research Institute Company Limited, Hong Kong (CN)

(72) Inventors: Zeineb Ben Aziza, Paris (FR); Xiaohan Wang, Hong Kong (CN); Ting Hao, Hong Kong (CN); Xiuling Zhu, Hong Kong (CN); Kenny Chan, Hong Kong (CN)

(73) Assignee: Hong Kong Applied Science and Technology Research Institute Company Limited, Hong Kong (CN)

( * ) Notice: Subject to any disclaimer, the term of this patent is extended or adjusted under 35 U.S.C. 154(b) by 0 days.

(21) Appl. No.: 16/930,587

(22) Filed: Jul. 16, 2020

(65) Prior Publication Data
US 2022/0016923 A1    Jan. 20, 2022

(51) Int. Cl.
*B42D 25/328* (2014.01)
*B42D 25/333* (2014.01)
(Continued)

(52) U.S. Cl.
CPC ........... *B42D 25/328* (2014.10); *B42D 25/29* (2014.10); *B42D 25/333* (2014.10); *G02B 5/18* (2013.01);
(Continued)

(58) Field of Classification Search
CPC .................................................. B42D 25/328
See application file for complete search history.

(56) References Cited

U.S. PATENT DOCUMENTS

| 6,141,123 A | 10/2000 | Nakashima et al. |
| 8,848,266 B2 | 9/2014 | Tompkin et al. |
(Continued)

FOREIGN PATENT DOCUMENTS

| CN | 201619321 U | 11/2010 |
| CN | 105899983 A | 8/2016 |
(Continued)

OTHER PUBLICATIONS

International Search Report and Written Opinion of PCT application No. PCT/CN2020/105230 issued from the International Search Authority dated Apr. 27, 2021.
(Continued)

*Primary Examiner* — Kyle R Grabowski
(74) *Attorney, Agent, or Firm* — S&F/WEHRW

(57) ABSTRACT

A multilayered optical security device has a resonant waveguide grating (RWG) layer on an under layer having a hologram. The RWG layer has plural RWGs for generating one or more patterns. Each RWG has first and second RWG portions, with diffraction gratings of different grating periods, for light coupling-in and coupling-out, respectively. Using the RWGs minimizes interference to a holographic image generated by the under layer. This advantage is especially useful when the holographic image carries digital data such as in digital holographic encryption where an encrypted hologram is used in the under layer. The digital data may contain biometric information such as a fingerprint. In each RWG portion of an individual RWG, scattering elements in a grating are curved to thereby enhance an angular tolerance in azimuthal angle during observing the patterns by an observer while the individual RWG is still selective in elevation angle.

17 Claims, 7 Drawing Sheets

(51) Int. Cl.
  *B42D 25/29* (2014.01)
  *G02B 5/18* (2006.01)
  *G02B 5/32* (2006.01)
  *G02B 6/10* (2006.01)

(52) U.S. Cl.
  CPC ............ *G02B 5/1842* (2013.01); *G02B 5/32* (2013.01); *G02B 6/10* (2013.01)

(56) References Cited

U.S. PATENT DOCUMENTS

| | | | |
|---|---|---|---|
| 9,798,290 B2 | 10/2017 | Tsang | |
| 2006/0078113 A1 | 4/2006 | Javidi et al. | |
| 2007/0247714 A1* | 10/2007 | Schnieper | B42D 25/328 359/558 |
| 2008/0138013 A1* | 6/2008 | Parriaux | G02B 5/1814 385/37 |
| 2012/0299287 A1* | 11/2012 | Eichenberger | B42D 25/328 283/85 |
| 2014/0103634 A1* | 4/2014 | O'Boyle | B42D 25/29 283/85 |
| 2016/0356956 A1* | 12/2016 | Davoine | G02B 5/203 |
| 2018/0001692 A1 | 1/2018 | Rich et al. | |
| 2019/0009609 A1 | 1/2019 | Dietemann | |

FOREIGN PATENT DOCUMENTS

| | | |
|---|---|---|
| CN | 207704754 U | 8/2018 |
| CN | 108883652 A | 11/2018 |
| CN | 109070622 A | 12/2018 |
| EP | 3205512 A1 | 8/2017 |
| EP | 3205512 B1 | 6/2018 |
| WO | 2015096859 A1 | 7/2015 |

OTHER PUBLICATIONS

G. Quaranta, G. Basset, O. J. F. Martin and B. Gallinet, "Recent Advances in Resonant Waveguide Gratings," Lasers & Electronics Reviews, Jul. 30, 2018.

First Office Action with Search Report of CN202080001495.3 issued by the China National Intellectual Property Administration (CNIPA) of the PRC dated Jun. 21, 2021.

* cited by examiner

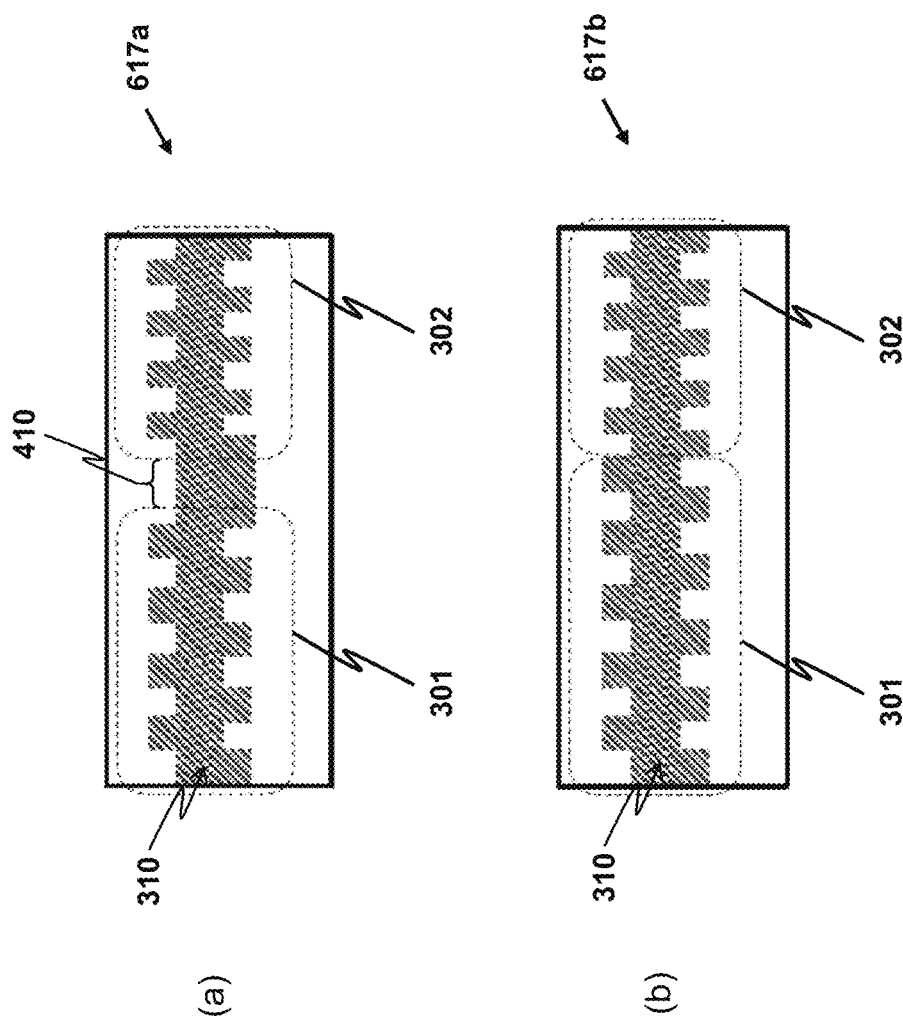

MULTILAYERED OPTICAL SECURITY DEVICE

FIELD OF THE INVENTION

The present disclosure generally relates to an optical security device having a multilayered structure for displaying an image and one or more patterns. In particular, the present disclosure relates to such device having a RWG layer positioned above an under layer, whereby using the RWG layer avoids interfering the image, allowing substantially distortion-free transmission of the image from the under layer to an observer. The image may be a holographic image or even a holographically encrypted image.

BACKGROUND

A security hologram is often used as an anti-counterfeiting means for proving authenticity of an object attached with the security hologram. The security hologram and other optical security components have an advantage of being unaffected by electromagnetic-interference tampering and digital-data tampering. To enhance security, multiple security features may be embedded in an optical security device for enabling a person to verify authenticity of an object independently from different features. Furthermore, the features may offer multiple levels of security. For instance, some of the features are meaningful images visually verifiable by a human user, such as company logos, for achieving a normal security level, while remaining features are optical images carrying encrypted digital data recognizable by a specialized machine for achieving a high level of security. Incorporating multiple security features at different levels of security to the optical security device is challenging.

U.S. Pat. No. 8,848,266 discloses a security element implemented as a multilayered film body for providing multiple security features. The security element has a volume hologram layer, in which a volume hologram is recorded, for providing a first optically variable information item. The security element has a replication layer, in the surface of which a SRG providing a second optically variable information item is molded and which is arranged above the volume hologram layer. However, the holographic image generated from the volume hologram is interfered by the SRG, potentially modifying the holographic image when the holographic image is seen by an observer.

There is a need in the art for an optical security device implemented with a multilayered structure for providing multiple security features while reducing or avoiding interference introduced from one layer to another.

SUMMARY OF THE INVENTION

An aspect of the present disclosure is to provide a multilayered optical security device for displaying an image and one or more patterns.

The multilayered optical security device comprises an aperture, an under layer and a RWG layer. The aperture is arranged to face an observer such that the one or more patterns are viewable to the observer through the aperture. The aperture defines a top side of the device. The under layer, located below the top side, is used for generating the image upon the under layer being illuminated. The RWG layer is located between the top side and the under layer. The RWG layer comprises a plurality of RWGs configured to generate the one or more patterns upon illuminated with an incident light beam received through the aperture. An individual RWG comprises a first diffraction grating and a second diffraction grating. The first and second diffraction gratings are attached to the waveguide. An individual diffraction grating has a grating period. The grating period is selected such that a first light beam having a preselected wavelength and a preselected propagation direction resonates with the individual RWG under the selected grating period, causing the first light beam to couple in or out of the individual RWG. Furthermore, this RWG structure becomes almost transparent to a second light beam that is out of resonance, and allows the propagation of the second light beam without distortion, thus avoiding interference to the second light beam during the second light beam propagating through the individual RWG. It allows the incident light beam to transmit through the RWG layer to illuminate the under layer. It also avoids the RWG layer to interfere the image during transmission from the under layer to the aperture.

Preferably, the individual RWG comprises first and second RWG portions coupled together. The first RWG portion has the first diffraction grating, and the second RWG portion has the second diffraction grating. The first and second diffraction gratings have different grating periods for setting different resonance conditions for the first and second RWG portions such that the individual RWG filters a received portion of the incident light beam and generates an outgoing light beam having a predictable wavelength and leaving the individual RWG at a predictable exit angle from the RWG layer.

The respective diffraction grating of an individual RWG portion comprises one or two periodic arrangements of scattering elements. Preferably, an individual scattering element has a curved shape to thereby enhance an angular tolerance in observing the one or more patterns by the observer. The individual scattering element may be semicircular, semi-elliptical or arc-shaped.

In certain embodiments, the first and second RWG portions are coupled together by sharing a common waveguide. The first RWG portion may be separated from the second RWG portion by a distance. Alternatively, the first and second RWG portions may be immediately adjacent to each other, and a first diffraction grating of the first RWG portion may touch a second diffraction grating of the second RWG portion.

Preferably, the waveguide and the two diffraction gratings of the individual RWG are dimensioned to provide single-mode optical propagation.

In certain embodiments, the plurality of RWGs is substantially-uniformly distributed over the RWG layer.

In certain embodiments, the device further comprises a polymer superstrate covering the RWG layer for isolating the RWG layer from the top side to thereby protect the RWG layer.

In certain embodiments, the device further comprises a substrate underneath the under layer for providing mechanical support to the under layer and the RWG layer. The substrate may be formed of a soft material, allowing the device to be flexible.

In certain embodiments, the under layer includes a hologram such that the image generated by the under layer is a holographic image. The holographic image may include one or more holographically encrypted images. In certain embodiments, at least one holographically encrypted image is embedded with biometric information data.

In certain embodiments, the under layer is formed with a phase-only hologram.

If the one or more patterns consist of a first number of plural patterns, the plurality of RWGs may be partitioned into the first number of subsets, where an individual subset of RWGs is used to create a respective pattern. Respective RWGs among different subsets of RWGs may be interlaced.

In certain embodiments, the device further comprises an additional aperture located on a bottom side opposite to the top side for viewing the image.

Other aspects of the present disclosure are disclosed as illustrated by the embodiments hereinafter.

Skilled artisans will appreciate that elements in the figures are illustrated for simplicity and clarity and have not necessarily been depicted to scale.

DETAILED DESCRIPTION

As used herein in the specification and appended claims, the term "avoid" or "avoiding" refers to any method to partially or completely preclude, avert, obviate, forestall, stop, hinder or delay the consequence or phenomenon following the term "avoid" or "avoiding" from happening. The term "avoid" or "avoiding" does not mean that it is necessarily absolute, but rather effective for providing some degree of avoidance or prevention or amelioration of consequence or phenomenon following the term "avoid" or "avoiding".

A hologram is a physical recording of an interference pattern which uses diffraction to reproduce a three-dimensional light field, resulting in a holographic image that retains the depth, parallax, and other properties of the original scene. As used herein, "a holographic image" is an image generated by a hologram. A holographic image may be a two- or three-dimensional image. The holographic image can be used as a security feature.

As used herein, "a pattern" is a two-dimensional image. Examples of a pattern include a two-dimensional design, a visually-recognizable mark, a line-art picture, etc. The line-art picture may have a solid background or a transparent background. The pattern can also be used as a security feature.

Occasionally, "elevation angle" and "azimuthal angle" are used in describing a pointing direction from a reference point on an optical security device to an observer of a pattern or an image such as a holographic image. The pointing direction is also related to a viewing direction of the observer. In simple words, the elevation angle is related to the up-down viewing direction of the observer while the azimuthal angle is related to the viewing direction projected on the horizontal plane.

Disclosed herein is a multilayered optical security device having a multilayered structure for displaying an image and one or more patterns. Herein in the present disclosure, the aforesaid image and an individual pattern are regarded as two different entities. The image is a general image, and may be a natural image, an artificial image, a two-dimensional image, a three-dimensional image (such as a holographic image), etc. The multilayered structure has a RWG layer on an under layer such that the image generated by the under layer is required to pass through the RWG layer. As demonstrated hereinafter, using the RWG layer has a useful advantage of avoiding interfering the image, allowing substantially distortion-free transmission of the image from the under layer to an observer to be achievable. This advantage is especially useful if the image carries digital data.

Figure 1:
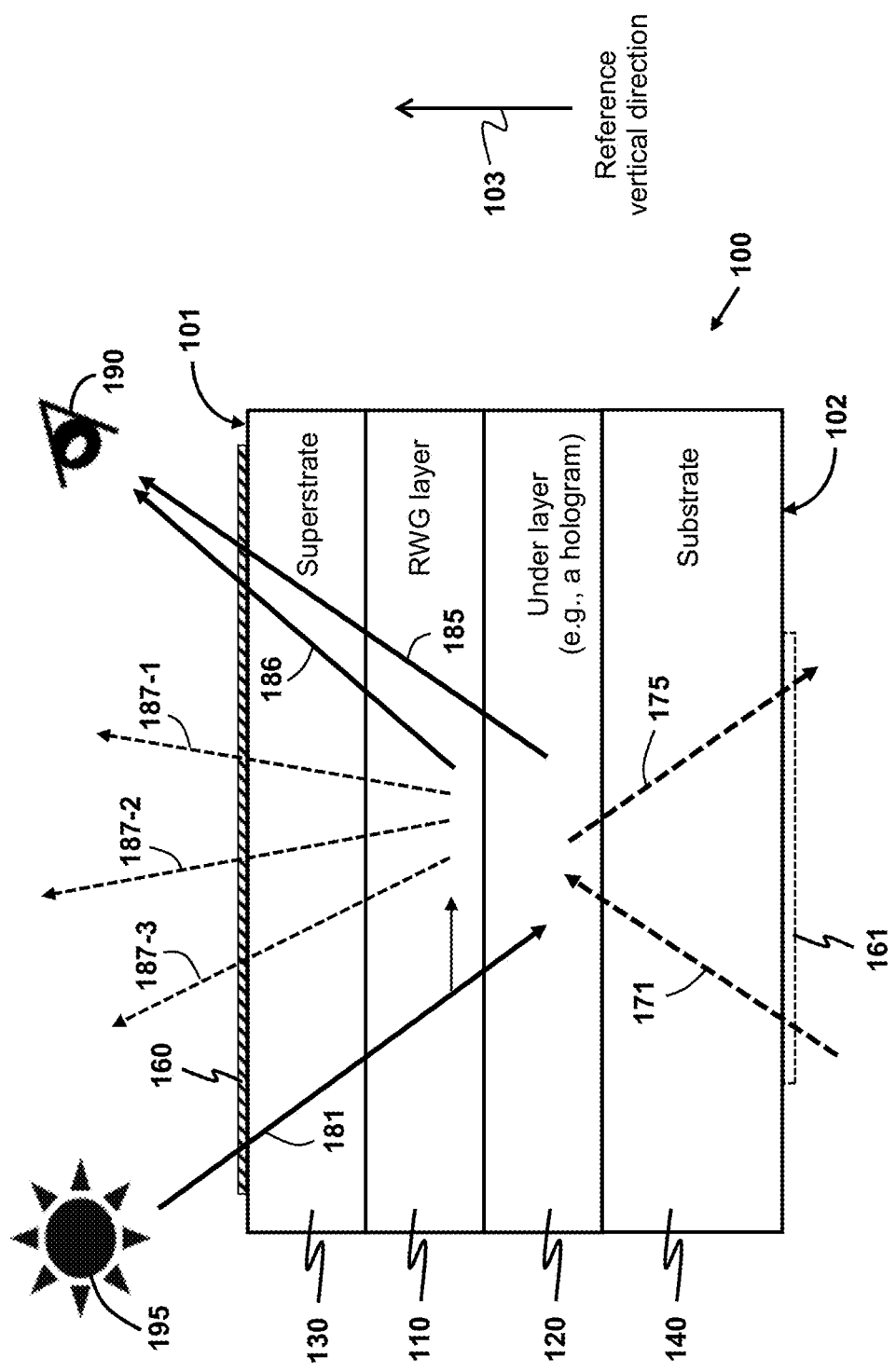
FIG. 1 depicts a multilayered optical security device in accordance with an exemplary embodiment of the present disclosure.

The disclosed multilayered optical security device is illustrated with the aid of FIG. 1, which depicts an exemplary multilayered optical security device 100.

In the device 100, various layers are allowed to be illuminated by an incident light beam 181 arrived through an aperture 160 for producing an image and one or more patterns. The aperture 160 generally means an opening for allowing light to pass through, and may simply be a transparent window. The aperture 160 also allows various light beams 186, 187-1:3 carrying the one or more patterns to pass through such that the one or more patterns are viewable by an observer 190. The image may or may not be viewable through the aperture 160 depending on different realizations of the device 100. If the image is viewable through the aperture 160, the image is carried by a light beam 185. The observer 190 means an object for receiving the one or more patterns and optionally the image. The observer 190 may be, for example, a human observer, an imaging sensor, or a specialized machine for imaging and decoding the image and one or more patterns. The light beams 186, 187-1:3 propagate in different directions for angularly multiplexing the one or more patterns. Note that the aperture 160 is arranged to face the observer 190. Furthermore, the aperture 160 defines a top side 101 and a bottom side 102 of the device 100. The aperture 160 is located on the top side 101. The bottom side 102 is opposite to the top side 101. A reference vertical direction 103 is defined as a pointing direction from the bottom side 102 to the top side 101. Herein in the specification and appended claims, positional and directional words such as "above," "below," "higher," "upper," "lower," "top," "bottom" and "horizontal" are interpreted with reference to the reference vertical direction 103.

The device 100 comprises a RWG layer 110 and an under layer 120. The under layer 120 is located below the top side 101 while the RWG layer 110 is located between the top side 101 and the under layer 120.

The under layer 120 generates the image when the under layer 120 is illuminated. Of particular importance to security applications, the under layer 120 may contain a hologram such that the image generated by the under layer 120 is a holographic image. Structural details and manufacturing methods of the hologram can be found in the art, e.g., in U.S. Pat. No. 6,141,123. Hereinafter various advantages of the disclosed device 100 are elaborated by considering the specific case that the under layer 120 includes the hologram for generating the holographic image. The advantages carry over to any general image unless otherwise stated.

Apart from illuminating the under layer 120 from the incident light beam 181 arrived from the aperture 160 located on the top side 101, it is possible that the hologram of the under layer 120 is intended to be illuminated by a second incident light beam 171 traveled from the bottom side 102 to the under layer 120 through an optional additional aperture 161. Besides being reflective, the hologram may be transmissive. Hence, the holographic image generated by the hologram may travel towards the top side 101 (e.g., carried by the light beam 185) or towards the bottom side 102 (e.g., carried by a light beam 175). Hereinafter the advantages of the disclosed device 100 are elaborated by assuming that the under layer 120 is illuminated from the top side 101 and the holographic image travels from the under layer 120 towards the top side 101. The advantages carry over to other combinations of illumination direction and holographic-image traveling direction.

Figure 2:
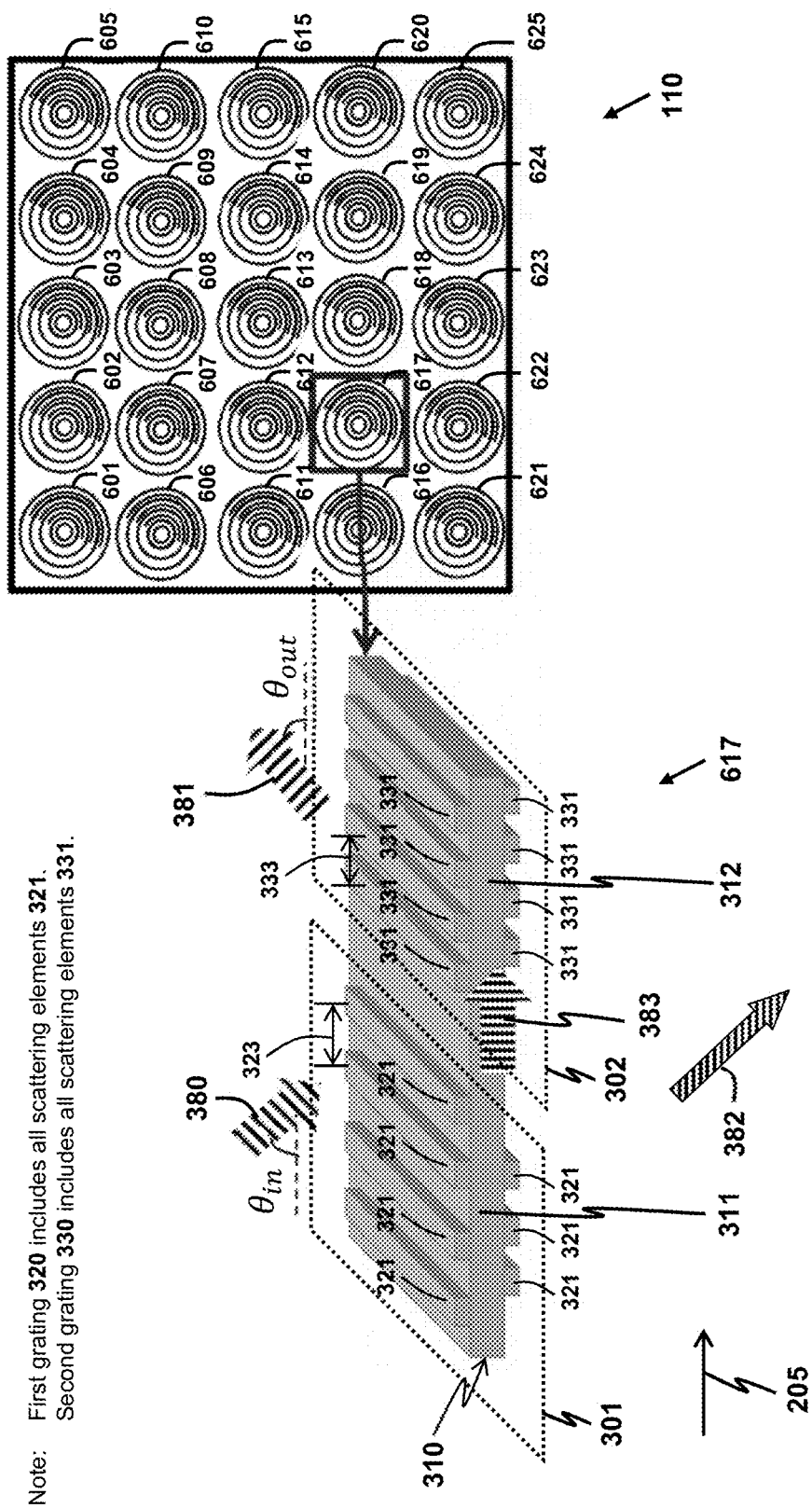
FIG. 2 depicts an exemplary RWG layer used in the disclosed device, where the RWG layer is formed with a plurality of RWGs, each RWG having first and second RWG portions coupled together preferably with different grating periods, the first and second RWG portions being used for light coupling-in and coupling-out, respectively.

The RWG layer 110 is used for generating the one or more patterns while allowing a portion of the incident light beam 181 to pass through to reach the under layer 120. FIG. 2 depicts a schematic showing an exemplary construction of the RWG layer 110. The RWG layer 110 comprises a plurality of RWGs 601-625 configured to generate the one or more patterns upon illuminated. Note that although 25 RWGs 601-625 arranged in a rectangular array are shown in FIG. 2 for illustrating the RWG layer 110, the present disclosure is not limited to this number of RWGs and this form of arrangement, any number of RWGs distributed over the RWG layer 110 in any manner, e.g., in a circular arrangement, may be used. The RWGs 601-625 have a similar structure. Take the RWG 617 as a representative RWG for illustration.

The RWG 617 comprises a waveguide 310, a first diffraction grating 320 and a second diffraction grating 330. The first and second diffraction gratings 320, 330 are attached to the waveguide 310. The waveguide 310 is formed by a substantially-transparent dielectric having a refractive index higher than a surrounding environment in the vicinity of the waveguide 310. The first diffraction grating 320 is obtained by periodically arranging plural scattering elements 321 on one side or both sides of the waveguide 310. Similarly, the second diffraction grating 330 has periodically-arranged scattering elements 331 disposed on one side or both sides of the waveguide 310. In FIG. 2, the first diffraction grating 320 is illustrated with two periodic arrangements of scattering elements 321 respectively located on two opposite sides of the waveguide 310, and each of the two periodic arrangements of scattering elements 321 forms a corrugated structure. It is similar for the second diffraction grating 330. Note that the RWG 617 has an orientation along a direction 205. The orientation of the RWG 617 is perpendicular to the scattering elements 321 in the first diffraction grating 320, or to the scattering elements 331 in the second diffraction grating 330.

The first and second diffraction gratings 320, 330 are located on different portions of the waveguide 310. Define a first waveguide portion 311 as a first portion of the waveguide 310 on which the first diffraction grating 320 is laid. Similarly, define a second waveguide portion 312 as a second portion of the waveguide 310 on which the second diffraction grating 330 is laid. For convenience, define a first RWG portion 301 and a second RWG portion 302 as mutually non-overlapping portions of the RWG 617 such that the first RWG portion 301 has the first waveguide portion 311 and the first diffraction grating 320, and such that the second RWG portion 302 has the second waveguide portion 312 and the second diffraction grating 330. Note that the first and second RWG portions 301, 302 are coupled together. In particular, the first and second waveguide portions 311, 312 are linked together for achieving coupling.

Each of the first and second diffraction gratings 320, 330 is characterized by a grating period, which is a separation between adjacent scattering elements. The grating period determines a resonance condition of the RWG 617. The grating period and orientation can be selected such that an incoming light beam 380 specifically prepared to have a first preselected wavelength $\lambda_1$ and arrive at a first preselected (elevation) angle $\theta_{in}$ with respect to the waveguide 310 resonates with the RWG 617, causing the incoming light beam 380 to couple-in the RWG 617 and propagate along the waveguide 310 in the waveguide mode as an in-waveguide light beam 383. The grating period and orientation can also be selected such that an outgoing light beam 381 having the wavelength and leave at a second preselected (elevation) angle $\theta_{out}$ with respect to the waveguide 310 resonates with the RWG 617, causing the in-waveguide light beam 383 to couple out of the RWG 617 and form the outgoing light beam 381. Mathematical formulas for determining the grating period from $\lambda_1$ and $\theta_{in}$ or $\theta_{out}$ can be found in the art, for example, in EP 3,205,512 and in G. QUARANTA, G. BASSET, O. J. F. MARTIN and B. GALLINET, "Recent Advances in Resonant Waveguide Gratings," *Lasers & Electronics Reviews*, 30 Jul. 2018. Note that since the RWG 617 is usually used to interact with the incoming light beam 380 in the visible and near-infrared spectrum, the waveguide 310 and the first and second diffraction gratings 320, 330 are usually dimensioned in nanoscale, and are implemented as nanostructures.

Without loss of generality and for the purpose of illustrating the disclosed device 100, assume that the first RWG portion 301 is configured to couple-in the incoming light beam 380 and the second RWG portion 302 is configured to couple-out the in-waveguide light beam 383 to form the outgoing light beam 381. Consider that the incoming light beam 380 (viz., a received portion of the incident light beam 181) is incident on the first RWG portion 301 at an incident angle, viz., $\theta_{in}$. If the wavelength and incident angle of the incoming light beam 380 meet the resonance condition of the first RWG portion 301 and if the last-mentioned wavelength satisfies the resonance condition of the second RWG portion 302, then the first RWG portion 301 couples-in the incoming light beam 380 to form the in-waveguide light beam 383 propagating from the first waveguide portion 311 to the second waveguide portion 312, at which the in-waveguide light beam 383 is coupled-out from the second RWG portion 302 with a predetermined exit angle, viz., $\theta_{out}$, to form the outgoing light beam 381.

Conversely, if the incoming light beam 380 does not meet any one of the resonance conditions of the first and second RWG portions 301, 302, the incoming light beam 380 does not interact with the RWG 617 and simply bypasses the RWG 617 to form a bypassed light beam 382. As a result, it avoids interfering the incoming light beam 380 that is out of resonance with the RWG 617 when the incoming light beam 380 propagates through the RWG 617.

The presence of resonance condition(s) in the RWG 617 is advantageously used in the disclosed device 100. The incident light beam 181, which usually has multiple spectral contents and arrives at the device 100 from different directions, can at least partially transmit through the RWG layer 110 to illuminate the under layer 120. Furthermore, it is difficult or almost impossible for light beams carrying the holographic image to resonate with the RWGs 601-625 of the RWG layer 110, avoiding the RWG layer 110 to interfere the holographic image during transmission from the under layer 120 to the aperture 160. The holographic image receives minimal or negligible interference from the RWG layer 110. Generally, the RWG layer 110 becomes almost transparent out of resonance and allows the propagation of the holographic image without distortion. This advantage is of particular importance if the holographic image carries digital data, such as a holographically encrypted image in digital holographic encryption. (The holographically encrypted image is generated by an encrypted hologram in the under layer 120.) Nearly distortion-free reproduction of the holographic image is required in successful decryption of the encrypted data in the holographic image. As the holographic image may be received by a machine to decode digital data embedded in the holographic image, nearly distortion-free reproduction of the holographic image increases "a channel capacity" of an optical channel between the under layer 120 and the machine, allowing more digital data to be embedded in the holographic image.

Denote the grating period of the first diffraction grating 320 as a first grating period 323, and that of the second diffraction grating 330 as a second grating period 333. If the first and second grating periods 323, 333 take on the same value, the RWG 617 basically becomes a conventional RWG as described in the paper of G. QUARANTA, G. BASSET, O. J. F. MARTIN and B. GALLINET. As a result, multiple values of $\lambda_1$ may induce resonance in the RWG 617 and also the values of $\theta_{in}$ or $\theta_{out}$ affect each other. This result may not be preferable in certain applications of the device 100.

In a preferred embodiment, the first and second grating periods 323, 333 are selected to be different in order to set the resonance condition. As a result, with a suitable choice of other RWG parameters such as the waveguide dielectric refractive index, gratings depth, etc., it becomes feasible to configure the RWG 617 to resonate at only one value of wavelength. The net effect is that the RWG 617 filters a received portion of the incident light beam 181 and generates the outgoing light beam 381 having a predictable wavelength and leaving the RWG 617 at a predictable exit angle from the RWG layer 110.

Figure 6:
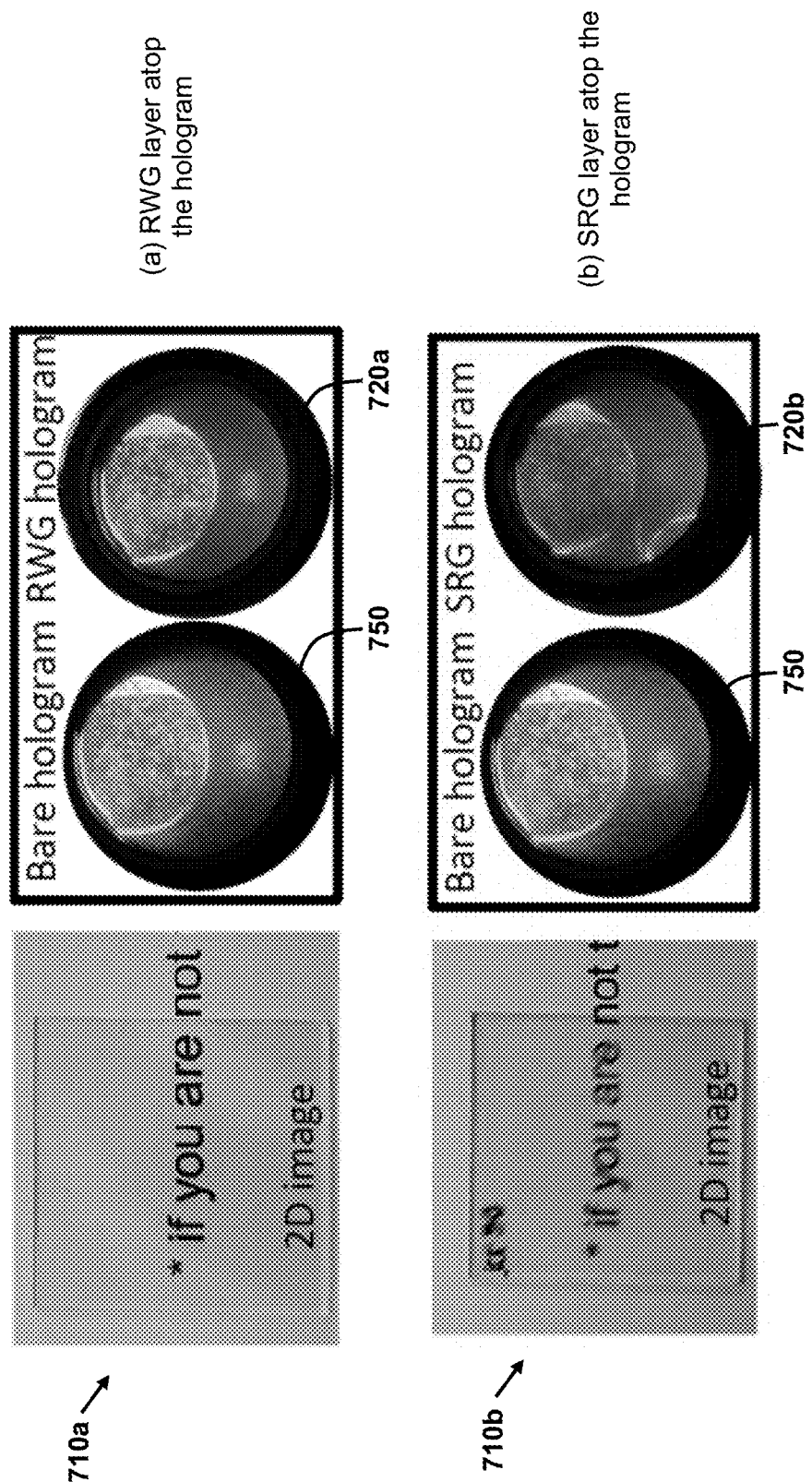
FIG. 6 shows experimental results demonstrating minimal interference introduced by RWGs to light beams and holographic images in comparison to SRGs.

FIG. 6 experimentally demonstrates the minimal interference introduced by RWGs to light beams and holographic images in comparison to using SRGs. In picture 710a, a first slab implemented with a layer of RWGs is placed on a text, and a clear image of the text without noticeable distortion is seen. In picture 710b, a second slab having a layer of SRG is also placed on the text, but a blurred image is observed. A holographic image 750 generated by a bare hologram is used as a reference for comparing resultant holographic images 720a, 720b when the hologram is placed below the RWG layer and the SRG layer, respectively. It is shown that the holographic image 720a after passing through the RWG layer is sharper and clearer than the holographic image 720b after passing through the SRG layer.

In the device 100, a pattern is generated from a certain plurality of RWGs in the RWG layer 110. Respective RWGs in the aforementioned plurality of RWGs are designed to have respective values of $\lambda_1$, $\theta_{in}$ and $\theta_{out}$. These values are obtained according to the positions of a light source 195 and the observer 190, and also the color distribution of the pattern. Note that $\theta_{in}$ and $\theta_{out}$ are elevation angles. The positions of the light source 195 and the observer 190 also provide information on azimuthal angles thereof. Grating periods and orientations of these respective RWGs are thus determined. Generally, orientations of the respective RWGs are adjusted to align with the intended or expected azimuthal angle that the observer 190 views the pattern.

Figure 3:
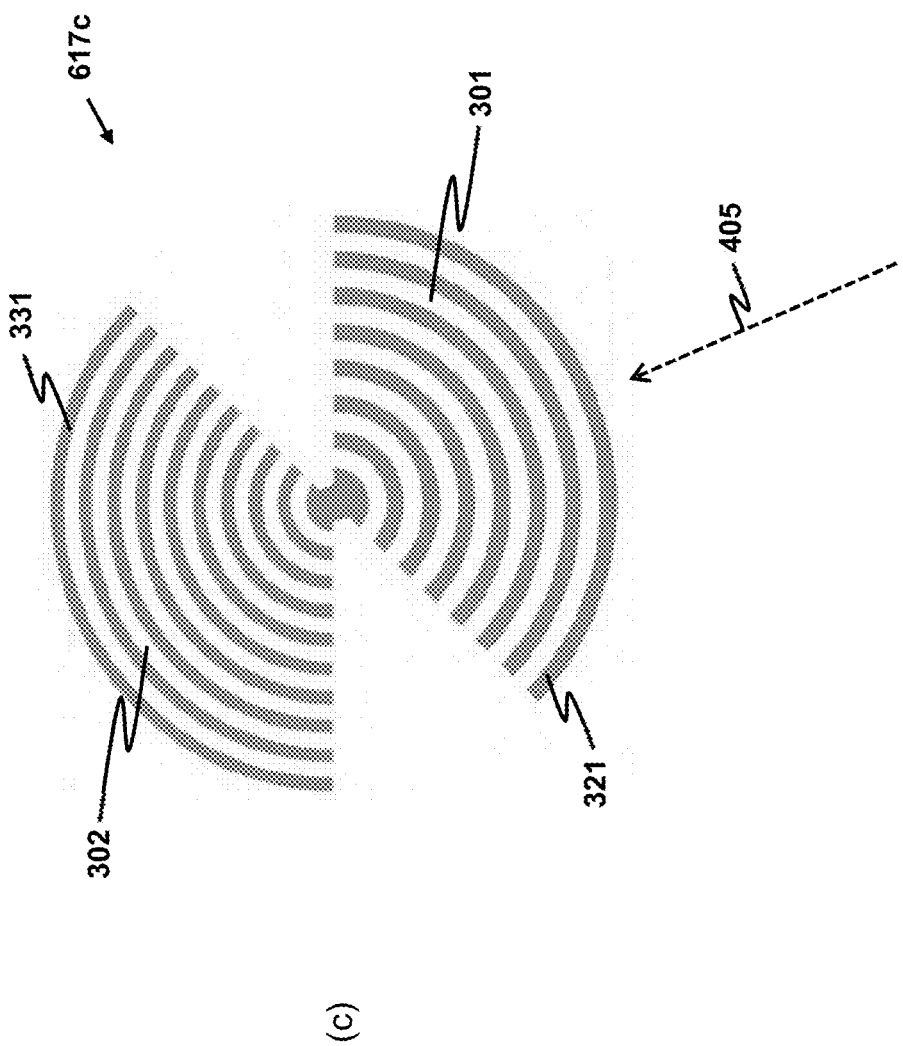
FIG. 3 depicts three embodiments of the RWG.

The first and second RWG portions 301, 302 are coupled together by setting up an optical path to link the first and second waveguide portions 311, 312 together. Practically, the first and second RWG portions 301, 302 are coupled together by sharing the waveguide 310. FIG. 3 depicts two embodiments of arranging the first and second RWG portions 301, 302 in sharing the common waveguide 310. In a first realization 617a of the RWG 617, the first RWG portion 301 is separated from the second RWG portion 302 by a distance 410, which may be chosen to be shorter or longer than lengths of the first and second RWG portions 301, 302. Between the first and second RWG portions 301, 302, there is no grating to modify the propagation of the in-waveguide light beam 383. In a second realization 617b of the RWG 617, the first and second RWG portions 301, 302 are immediately adjacent to each other, and in particular, the first diffraction grating 320 touches the second diffraction grating 330.

As mentioned above, the first and second waveguide portions 311, 312 have a common refractive index higher than the refractive index of surrounding environment. By taking into account the refractive index difference, preferably, the first and second waveguide portions 311, 312 and the first and second diffraction gratings 320, 330 are dimensioned to provide single-mode propagation along the first and second waveguide portions 311, 312 (or the waveguide 310) for an advantage of enhancing spectral/angular selectivity in generation of the one or more patterns.

The RWG 617 is similar to the one disclosed in EP 3,205,512. Manufacturing methods disclosed in EP 3,205, 512 may be adopted to fabricate the RWG layer 110 of the disclosed device 100.

Conventionally, the first and second diffraction gratings 320, 330 are realized as linear gratings. A linear grating is a grating whose scattering elements are linear. A RWG using linear gratings is referred to as a linear RWG. A linear RWG has a small angular width in azimuth in generating an outgoing light beam, such that the observer 190 is easy to miss the generated pattern if the observer 190 slightly shifts his or her left-right viewing direction. As a result, the linear RWG provides a low value of angular tolerance for the observer 190 to observe the one or more patterns. The inventors have observed that if the scattering elements are made to be curved, the angular tolerance is increased.

Refer to FIG. 2. In the RWG 617, preferably, each of scattering elements 321, 331 in the first and second diffraction gratings 320, 330 has a curved shape so as to enhance an angular tolerance in observing the one or more patterns by the observer 190. As examples, an individual scattering element may be semi-circular, semi-elliptical, or arc-shaped. FIG. 3 additionally depicts a third realization 617c of the RWG 617 (denoted as the RWG 617c for simplicity). The RWG 617c has scattering elements 321, 331 that are arc-shaped, i.e. in a shape of an incomplete ring. The RWG 617c is referred to as an arc-shaped RWG. Note that an orientation of the RWG 617c is given by an orientation direction 405, obtained as a central axis of the RWG 617c with a direction from the first RWG portion 301 (for light in-coupling) to the second RWG portion 302 (for light out-coupling).

Figure 4:
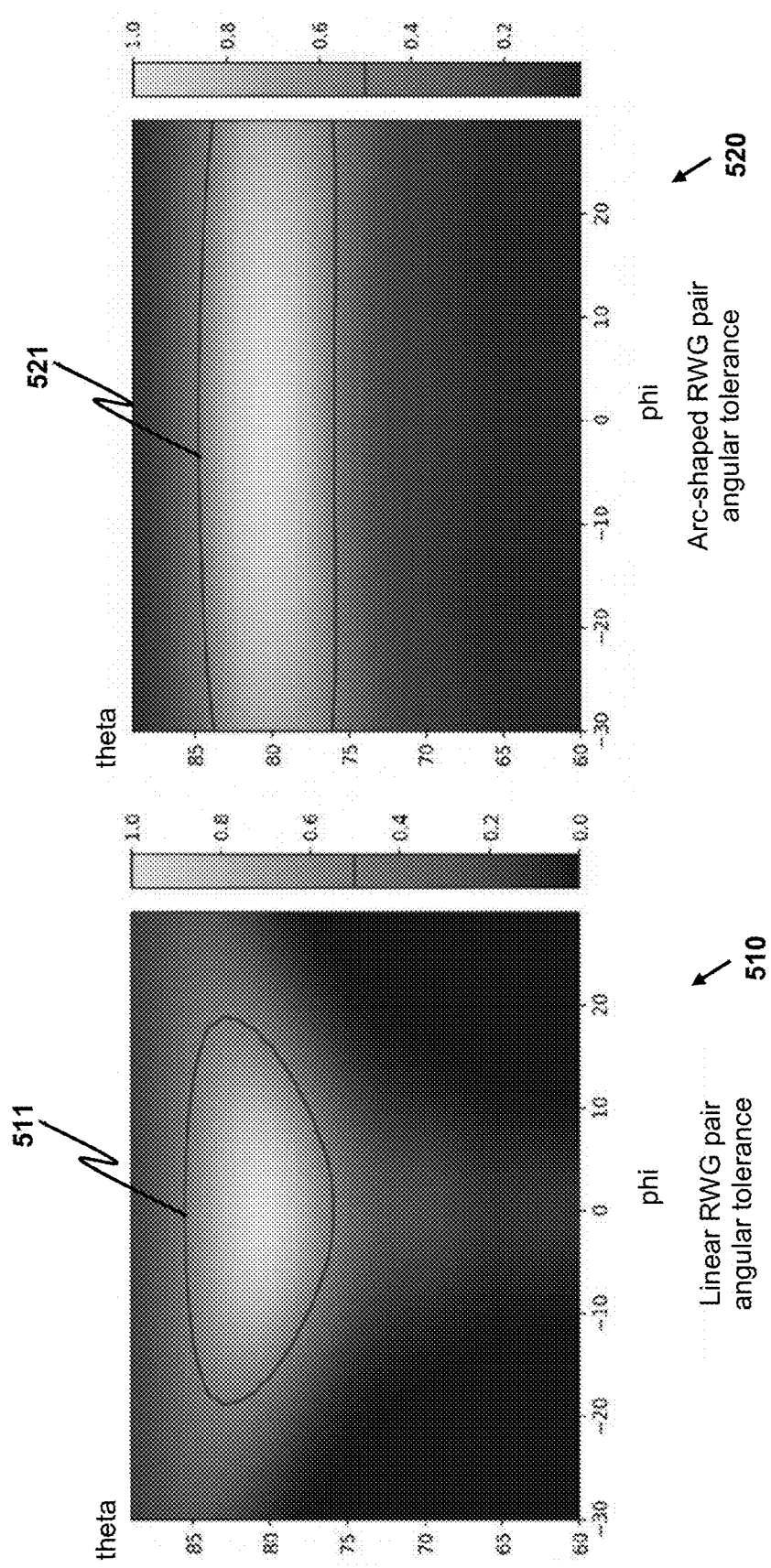
FIG. 4 depicts simulation results of intensity distribution of light coupled-out of the RWG against elevation angle and azimuthal angle for demonstrating an advantage of offering greater angular tolerance in pattern observation by an observer by using an arc-shaped RWG over a linear RWG.

FIG. 4 plots simulation results of intensity distribution in the far field of light coupled out from the RWG layer 110 against different elevation angles θ and azimuthal angles φ for a linear RWG (shown in graph 510) and an arc-shaped RWG (shown in graph 520). Consider regions 511 and 521 on the graphs 510 and 520, respectively. The region 511 is a collection of (θ, φ)-pairs each giving an intensity that is at least 50% of the highest intensity for the linear RWG. The region 521 is the corresponding one for the arc-shaped RWG. It is shown that the arc-shaped RWG provides a wider range of φ under a constant θ than the linear RWG does. The result shows that the arc-shaped RWG provides a greater angular tolerance in azimuthal angle during pattern observation than the linear RWG does, but the generated pattern is still selective in elevation angle. This observation demonstrates the advantage of using curved scattering elements in forming the first and second gratings of the RWG.

Figure 5:
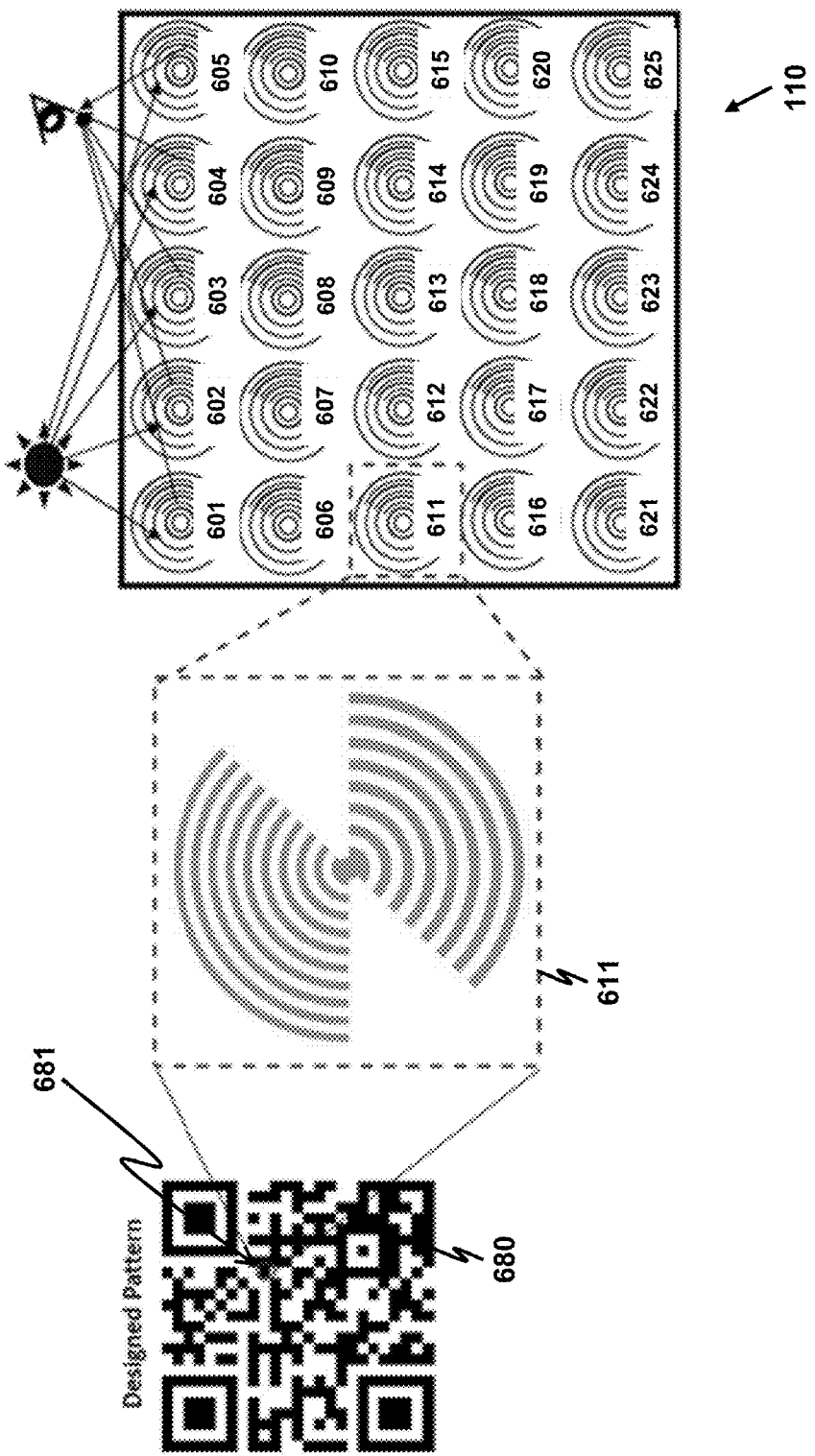
FIG. 5 depicts, for illustration purpose, a scheme of embedding a dedicated pattern into the RWG layer.

FIG. 5 depicts a scheme of embedding a dedicated pattern 680 into the RWG layer 110. Consider an example that the RWG layer 110 has an array of RWGs 601-625. Each of the RWGs 601-625 is intended to produce an outgoing light beam in a particular direction (specified by an elevation angle θ and an azimuthal angle φ), and the outgoing light beam carries "a pixel" of the pattern 680. For example, the RWG 611 reproduces a pixel 681. If the RGW layer 110 is intended to produce the designated pattern 680 only, all the RWGs 601-625 are designed by determining particular grating periods and orientations of diffraction gratings and exit angles (including elevation angles and azimuthal angles) of outgoing beams such that a continuity condition of propagation vector is satisfied, that is, all pattern pixels can be seen under preselected illumination or observation angle. Multiple colors may be added to the designated pattern 680 by setting different grating periods for different RWGs 601-625. Pattern observation at multiple azimuthal angles may be realized by varying periods and orientations of different RWGs 601-625 with respect to illumination and observation angles.

If it is desired that multiple patterns are embedded in the RWG layer 110 for display at different observation angles through angular multiplexing, and if there are a first number of such patterns to be displayed, the plurality of RWGs 601-625 may be partitioned into the first number of subsets. An individual subset of RWGs is used to create a respective pattern.

In one embodiment, respective RWGs in each subset are clustered together such that the respective RWGs in an individual subset form a contiguous region on the RWG layer 110. For illustration, consider an example that two patterns are required to be generated. The plurality of RWGs 601-625 is divided into two subsets. The first subset has the RWGs 601-615. The second subset consists of the RWGs 616-625. In another embodiment, respective RWGs among different subsets of RWGs are interlaced. Consider again the aforementioned example. In one arrangement, the first subset contains the RWGs 601-605, 611-615, 621-625, and the second subset has the RWGs 606-610, 616-620. Note that row-wise interfacing of the RWGs 601-625 is adopted in this arrangement. Similarly, column-wise interlacing may also be used. In another arrangement, RWGs that are adjacent are assigned to different subsets. For instance, the first subset contains the RWGs 601, 603, 605, 607, 609, 611, 613, 615, 617, 619, 621, 623, 625 while the second subset contains the RWGs 602, 604, 606, 608, 610, 612, 614, 616, 618, 620, 622, 624.

As mentioned above, apart from being distributed as a rectangular array, the plurality of RWGs 601-625 may be arranged in any form on the RWG layer 110, e.g., arranged along one or more circles, along mesh lines, as hexagonal grids, as a chessboard, or randomly, according to resolution requirements. The plurality of RWGs 601-625 may be substantially-uniformly distributed over the RWG layer 110, or unevenly distributed.

Other implementation details of the disclosed device 100 are illustrated as follows.

In certain embodiments, the under layer 120 is formed with a hologram such that a holographic image generated therefrom includes one or more holographically encrypted images. The under layer 120 is therefore formed with an encrypted hologram. Optionally, the under layer 120 is formed with a phase-only hologram. In certain embodiments, biometric information data, such as a fingerprint, a palm shape and a shape of vein, are embedded in at least one holographically encrypted image generated from the under layer 120.

Methods for fabricating the under layer 120 having an encrypted hologram can be found in the art, e.g., in US 2006/0078113 and U.S. Pat. No. 9,798,290. In general, a hologram that generates a holographically encrypted image upon illuminated can be obtained by encoding an image with an encryption mask. The holographically encrypted image is decryptable by overlaying the device 100 with a specific decryption mask under illumination of a coherent light beam. The decryption mask may be put on the top side 101, and the incident light beam 181 is formed with decryption information. After the incident light beam 181 passes through the RWG layer 110, which advantageously avoids interfering the incident light beam 181, coherence of the incident light beam 181 is not destroyed such that encrypted data embedded in the encrypted hologram can be successfully decrypted, thereby generating a decrypted holographic image. In one embodiment, the encrypted hologram is transmissive such that the decrypted holographic image is carried by the light beam 175 towards the bottom side 102. An imaging sensor may be conveniently located at the bottom side 102 to receive the decrypted holographic image, which contains plain data without encryption. Note that alternatively, the decryption mask may be put on the bottom side 102 with coherent light illumination, and the imaging sensor is then put on the top side 101 for receiving the decrypted holographic image.

In certain embodiments, the device 100 further comprises a superstrate 130 covering the RWG layer 110 for isolating the RWG layer 110 from the top side 101 to thereby protect the RWG layer 110. The superstrate 130 is transparent, and may be formed by polymer.

In certain embodiments, the device further comprises a substrate 140 underneath the under layer 120 for providing mechanical support to the under layer 120 and the RWG layer 110. The substrate 140 may be formed of a soft material, allowing the device to be flexible. Alternatively, it is also possible that the substrate 140 is made of a hard material.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A multilayered optical security device for displaying an image and one or more patterns, the device comprising:
   an aperture arranged to face an observer such that the one or more patterns are viewable to the observer through the aperture, the aperture defining a top side of the device;

an under layer below the top side for generating the image upon the under layer being illuminated; and a resonant waveguide grating (RWG) layer located between the top side and the under layer, the RWG layer comprising a plurality of RWGs configured to generate the one or more patterns upon illuminated with an incident light beam received through the aperture, an individual RWG comprising a waveguide and first and second diffraction gratings both attached to the waveguide, an individual diffraction grating having a grating period, wherein:

the grating period is selected such that a first light beam having a preselected wavelength and a preselected propagation direction resonates with the individual RWG under the selected grating period, causing the first light beam to couple in or out of the individual RWG while avoiding interference to a second light beam that is out of resonance with the individual RWG during the second light beam propagating through the individual RWG, thereby avoiding the RWG layer to interfere the image during transmission from the under layer to the aperture; and the individual diffraction grating comprises multiple periodic arrangements of scattering elements, the scattering elements defining concentric circles, to thereby enhance an angular tolerance in observing the one or more patterns by the observer.

2. The device of claim 1, wherein the individual RWG comprises first and second RWG portions coupled together, the first RWG portion having the first diffraction grating, the second RWG portion having the second diffraction grating, the first and second diffraction gratings having different grating periods for setting different resonance conditions for the first and second RWG portions such that the individual RWG filters a received portion of the incident light beam and generates an outgoing light beam having a predictable wavelength and leaving the individual RWG at a predictable exit angle from the RWG layer.

3. The device of claim 2, wherein the first and second RWG portions are coupled together by sharing the waveguide.

4. The device of claim 3, wherein the first RWG portion is separated from the second RWG portion by a distance.

5. The device of claim 3, wherein a first diffraction grating of the first RWG portion touches a second diffraction grating of the second RWG portion.

6. The device of claim 1, wherein the waveguide and the two diffraction gratings of the individual RWG are dimensioned to provide single-mode optical propagation.

7. The device of claim 1, wherein the plurality of RWGs is substantially-uniformly distributed over the RWG layer.

8. The device of claim 1 further comprising:
a polymer superstrate covering the RWG layer for isolating the RWG layer from the top side to thereby protect the RWG layer.

9. The device of claim 1 further comprising:
a substrate underneath the under layer for providing mechanical support to the under layer and the RWG layer.

10. The device of claim 9, wherein the substrate is formed of a soft material, allowing the device to be flexible.

11. The device of claim 1, wherein the under layer includes a hologram such that the image is a holographic image.

12. The device of claim 11, wherein the hologram is a phase-only hologram.

13. The device of claim 11, wherein the holographic image includes one or more holographically encrypted images.

14. The device of claim 13, wherein at least one holographically encrypted image is embedded with biometric information data.

15. The device of claim 1, wherein the one or more patterns consist of a first number of plural patterns, and wherein the plurality of RWGs is partitioned into the first number of subsets, an individual subset of RWGs being used to create a respective pattern.

16. The device of claim 15, wherein respective RWGs among different subsets of RWGs are interlaced.

17. The device of claim 1 further comprising:
an additional aperture located on a bottom side opposite to the top side for viewing the image.

* * * * *